3,793,447
COMPOSITIONS AND METHOD FOR REMOVING AND RETARDING DENTAL PLAQUE AND CALCULUS WITH 8 - HYDROXYQUINOLINE SULFATE
Peter D. De Palma, Philadelphia, Pa., and Joseph J. Loux, Morris Plains, N.J., assignors to Menley & James Laboratories, Ltd., Philadelphia, Pa.
No Drawing. Continuation-in-part of application Ser. No. 205,308, Dec. 6, 1971. This application Oct. 24, 1972, Ser. No. 299,982
Int. Cl. A61k 7/16
U.S. Cl. 424—54
4 Claims

ABSTRACT OF THE DISCLOSURE

Dentifrice compositions for retarding and removing dental calculus and plaque containing 8-hydroxyquinoline sulfate and a method of removing and retarding dental calculus and plaque by administering the compositions to the oral cavity of animal organisms.

---

This application is a continuation-in-part of copending Ser. No. 205,308, filed Dec. 6, 1971, now abandoned.

This invention relates to dentifrice compositions and a novel method of retarding and removing dental plaque and calculus administering these compositions. More specifically, this invention relates to a method of retarding and removing plaque and calculus by employing dentifrice compositions containing 8-hydroxyquinoline sulfate.

Plaque is a soft deposit upon the surface of a tooth which contains, for example, food debris which acts as a medium for the lodgement and growth of bacteria. Although it can be removed from the teeth after thorough abrasive action, it quickly reforms on the tooth surface. Dental plaque leads to the formation of calculus and/or dental caries. Calculus is the hard deposit which forms on and around teeth and under gums. If not removed, inflammation can result which will ultimately lead to periodontal disease and tooth loss.

In the field of oral and dental hygiene, there is a large variety of preparations employed as cleansing and/or hygienic agents for the oral cavity. Some typical examples include toothpastes, dental creams, tooth powders, mouth rinses, lozenges, tablets, aerosol sprays, chewing gum and the like. The anti-plaque or anti-calculus properties of these marketed preparations are of a very low order, if they exist at all. The problem of providing an effective agent which will inhibit dental plaque and calculus is well recognized by the dental profession.

It is therefore an object of this invention to prepare nontoxic dentifrice compositions and to provide by using these compositions a method of retarding and removing dental plaque and calculus.

The compositions and methods of this invention are unique in that they retard and remove plaque and calculus on dental surfaces. Such activity has never been reported for the compound described hereinafter. More specifically, the dentifrice compositions of this invention comprise 8-hydroxyquinoline sulfate having the following formula:

Formula 1

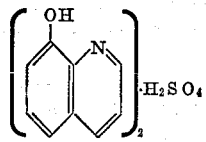

in a nontoxic carrier suitable for use in the oral cavity. Such compositions are intended to include toothpastes, dental creams, tooth powders, mouth rinses, lozenges, tablets, aerosol sprays, chewing gum and the like.

The ability of 8-hydroxyquinoline sulfate to retard and remove dental plaque and calculus has been established by the following standard tests:

Retarding plaque—In vivo

The teeth of two beagle dogs were cleaned of all adherent stainable material (plaque) employing an ultrasonic scaling unit and a dental disclosing agent. A dentifrice preparation containing 4% 8-hydroxyquinoline sulfate was applied to the test teeth on one side of the jaw while the other side was treated with a placebo dentifrice vehicle. Nine 30-second treatments were performed over a five day period and the adherent dental plaque was stained. In all cases the control teeth had significantly more plaque (stainable material) than those treated with 8-hydroxyquinoline sulfate. Careful visual examinations made throughout the study indicated no irritating or toxic effects on the oral tissues.

Retarding calculus—In vitro

In vitro calculus was formed according to a procedure described in the dental literature (Yankelowitz, S., et al., Journal of Dental Research, vol. 44, 648–653, 1965). Briefly, glass slides were mechanically passed through pooled human saliva containing 0.1% monocalcium phosphate and then through air at a rate of once every two minutes. During this time simulated or artificial calculus deposits similar in composition to human oral calculus formed. Active agents including 8-hydroxyquinoline sulfate were added to the pooled saliva. At the end of the test, the glass slides were visually graded for the presence of artificial calculus. The grading scale was: 0=no deposit; 1=poor deposit; 2=fair deposit; 3=good deposit; and 4=excellent deposit. Table 1 represents the results of this in vitro calculus test.

TABLE 1

| Agent | Concentration, percent by weight | Final calculus score |
|---|---|---|
| Water control | 10.1 | 4 |
| 8-hydroxyquinoline sulfate | 1.0 | 0–1 |
| Do | 0.1 | 0–1 |
| 8-hydroxyquinoline, magnesium salt | 0.1 | 3–4 |
| 8-hydroxyquinoline, zinc salt | 0.1 | 3–4 |

Retarding calculus—In vivo

In vivo calculus was formed by feeding rats a diet which is known to cause heavy calculus formation (Gressly F., Journal of the American Society of Periodontists, vol. 1, No. 2, 53–62, 1963). Briefly, the diet consists of cornstarch powder, whole milk powder, yeast, and a salt and vitamin mixture. One group of 10 rats, which served as the controls, were treated twice a day, Monday through Friday, and once a day Saturday and Sunday, by brushing the molar teeth for 30 seconds with water-soaked cotton buds. A group of 10 test rats were similarly treated with cotton buds soaked in a 5% aqueous solution of 8-hydroxyquinoline sulfate. At the end of two weeks the teeth of the animals were scored for the presence or absence of calculus. The data is presented in the following table:

TABLE 2

| Agent | Concentration, percent by weight | Mean calculus [1] score | Percent decrease |
|---|---|---|---|
| Water control | 100 | 3.48 | 0 |
| 8-hydroxyquinoline sulfate | 5 | 1.20 | 66 |

[1] Scored according to procedure described by Baer, P.N., Journal of Periodontology, vol. 32, 190–196, 1961.

Plaque removal—In vivo

The teeth of two beagle dogs were cleaned of all adherent stainable material (plaque) employing an ultrasonic scaling unit and a dental disclosing agent. Plaque was then allowed to accumulate for eleven days; then the teeth were stained and photographed to record plaque deposits. Twenty-four 60-second treatments were then performed over a thirteen day period. A dentifrice preparation containing 4% 8-hydroxyquinoline sulfate was applied to the test teeth on one side of the jaw, while the other side was treated with a placebo dentifrice vehicle. At the end of the study, the plaque was again stained and photographed. Table 3 represents the results.

TABLE 3

| | Percent plaque removed | |
|---|---|---|
| | 8-Hydroxyquinoline sulfate | Vehicle |
| Dog No.— | | |
| 601 | 57.5 | 7.5 |
| 602 | 40.0 | 22.5 |

Calculus removal—In vivo

Photographs were taken of the teeth of two beagle dogs with heavy calculus formation. A dentifrice preparation containing 4% 8-hydroxyquinoline sulfate was applied to the test teeth on one side of the jaw while the other side was treated with a placebo dentifrice vehicle. Forty 60-second treatments were performed over a 20-day period. Photographs were taken at the end of the study. Table 4 represents the results of this study.

TABLE 4

| | Percent calculus removed | |
|---|---|---|
| | 8-Hydroxyquinoline sulfate | Vehicle |
| Dog No.— | | |
| 260 | 37.5 | 0 |
| 265 | 25.0 | [1] 15.0 |

[1] It appeared that the calculus had been chipped off by the dog chewing on the cage or food cup since the slight loss showed was sudden and not a gradual effect associated with 8-hydroxyquinoline sulfate.

The above results indicate that 8-hydroxyquinoline sulfate is very effective in not only retarding but also removing plaque and calculus. Other 8-hydroxyquinoline derivatives, such as the magnesium and zinc salts, were inactive. In addition, careful visual examination and histopathologic evaluation indicated no irritating or toxic effects occurred in the oral tissues of the animals. In addition, all test animals showed normal behavioral and weight gain patterns.

The 8-hydroxyquinoline sulfate of Formula 1 will be present in a nontoxic carrier suitable for use in the oral cavity. A wide variety of dentifrice forms can be employed. Advantageously the compositions of this invention will take the form of dentifrices such as, for example, toothpaste, mouth rinse, tooth powder, lozenge, aerosol spray, dental cream or chewing gum. The 8-hydroxyquinoline sulfate will be present in an amount sufficient to retard plaque and calculus formation. Preferably the composition will contain the 8-hydroxyquinoline sulfate in an amount of from about 0.5% to about 10%, most advantageously from about 2% to about 6% by weight.

It will be evident to one skilled in the pharmaceutical art when preparing the above noted oral dentifrices that carriers suitable for the oral cavity such as, for example, sudsing agents, flavoring agents, abrasive polishing compounds, humectants and sweetening agents are standard pharmaceutical tools used in these preparations and are not an essential aspect of this invention. Therefore, the amount of these additive materials used can be varied.

Any suitable water insoluble polishing agent can be employed in the compositions of this invention, such as, for example, dicalcium phosphate, aluminum hydroxide, calcium carbonate, calcium polymetaphosphate, dicalcium orthophosphate dihydrate, sodium polymetaphosphate and mixtures thereof.

If a thickening agent is required, cellulose derivatives such as, for example, sodium carboxymethylcellulose and sodium carboxymethylhydroxyethyl cellulose or natural gums such as gum arabic or gum tragacanth may be employed.

Exemplary of sudsing agents which may be employed are, for example, sodium lauryl sulfate, sodium N-lauroyl sarcosinate, sulfonated monoglycerides of fatty acids having from 10 to 18 carbon atoms such as, for example, sodium monoglyceride sulfonates or mixtures thereof.

Among the specific compounds which may be employed as humectants are sorbitol, glycerine, polyhydric alcohols of like nature or mixtures thereof.

As examples of compounds that may be used as flavoring agents are peppermint oil, spearmint oil, wintergreen oil, sassafras oil and anise oil. Sweetening agents would include compounds such as, for example, saccharin, dextrose, and sodium cyclamate.

The method in accordance with this invention comprises administering to the oral cavity of an animal organism, preferably humans, an amount sufficient to retard and remove plaque and calculus of 8-hydroxyquinoline sulfate combined with a nontoxic carrier suitable for use in the oral cavity. Preferably the 8-hydroxyquinoline sulfate will be present in dentifrice compositions in an amount of from about 0.5% to about 10%, most advantageously from 2% to about 6%. The administration of the compositions is to the oral cavity of animals, preferably humans, suffering from plaque and calculus formation and will be administered one to four times daily.

When the method of administration described above is carried out not only is the formation of dental plaque and calculus on dental surfaces effectively retarded but also effectively removed without any irritating or toxic effects to the oral tissue.

The invention will be further clarified by the following specific examples. These examples are not limiting but are used to make obvious to one skilled in the art the full practice of this invention.

EXAMPLE 1—MOUTH RINSE

| Ingredients: | Amounts, percent |
|---|---|
| 8-hydroxyquinoline sulfate | 4.00 |
| 95% ethanol, U.S.P. | 10.00 |
| Tween 80 | 1.00 |
| Flavors | 0.29 |
| Sorbitol solution | 20.00 |
| Glycerin | 5.00 |
| Sodium borate | 0.10 |
| Distilled water, q.s. | 100.00 |

The 8-hydroxyquinoline sulfate, tween and flavors are mixed with the ethanol. The sodium borate is dissolved in water and this mixture along with the sorbitol and glycerin are slowly added to the alcoholic solution with constant agitation.

Rinse oral cavity four times a day.

EXAMPLE 2—TOOTHPASTE

| Ingredients: | Amounts percent |
|---|---|
| 8-hydroxyquinoline sulfate | 4.00 |
| Dicalcium phosphate, very fine powder | 50.00 |
| Sodium lauryl sulfate | 2.50 |
| Flavors | 0.30 |
| Sodium saccharin solution, 50% | 0.10 |
| Methyl paraben | 0.10 |
| Propylene glycol | 18.00 |
| Glycerin | 1.00 |
| Carboxymethylcellulose | 0.90 |
| Purified water | 23.10 |

The carboxymethylcellulose is slowly added to water and mixed. The flavors and methyl paraben are mixed with the propylene glycol and glycerin and added to the above mixture along with the sodium saccharin solution. The 8-hydroxyquinoline sulfate is dissolved in water and added to the mixture with agitation. The dicalcium phosphate and sodium lauryl sulfate are added with constant stirring.

Apply the toothpaste to the oral cavity four times a day.

EXAMPLE 3—TOOTH POWDER

| Ingredients: | | Amounts |
|---|---|---|
| 8-hydroxyquinoline sulfate | gm | 5.00 |
| Precipitated calcium carbonate | do | 93.00 |
| Saccharin sodium | do | 1.00 |
| Peppermint oil | ml | 0.50 |
| Methyl salicylate | ml | 0.50 |

The above ingredients are thoroughly mixed to form a tooth powder.

Brush the teeth with the powder twice a day.

We claim:
1. The method of removing dental calculus which comprises administering to the oral cavity of an animal organism suffering from calculus formation a dentifrice composition containing 8-hydroxyquinoline sulfate in an amount sufficient to remove said calculus combined with a nontoxic carrier.
2. The method of claim 1 wherein the dentifrice composition is a toothpaste.
3. The method of claim 1 wherein the dentifrice composition is a tooth powder.
4. The method of claim 1 wherein the dentifrice composition is a mouth rinse.

References Cited

The Merck Index, 7th ed., published by Merck & Co., Inc., Rahway, N.J., 1960, p. 545.

Weinstein et al., Journal of Oral Therapeutics and Pharmacology, vol. 1, No. 3, pp. 327–334, November 1964.

RICHARD L. HUFF, Primary Examiner